F. KITTEN.
Straw-Carrier for Thrashing-Machines.

No. 211,664.   Patented Jan. 28, 1879.

UNITED STATES PATENT OFFICE.

FLORENS KITTEN, OF FERDINAND, INDIANA.

IMPROVEMENT IN STRAW-CARRIERS FOR THRASHING-MACHINES.

Specification forming part of Letters Patent No. 211,664, dated January 28, 1879; application filed November 15, 1878.

*To all whom it may concern:*

Be it known that I, FLORENS KITTEN, of Ferdinand, in the county of Du Bois and State of Indiana, have invented certain new and useful Improvements in Straw-Carriers for Thrashing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in straw-carriers for thrashing-machines; and it consists in the arrangement and combination of parts, which will be more fully described hereinafter, whereby the straw is taken directly from the thrashing-machine and the grain separated from it.

Figure 1:
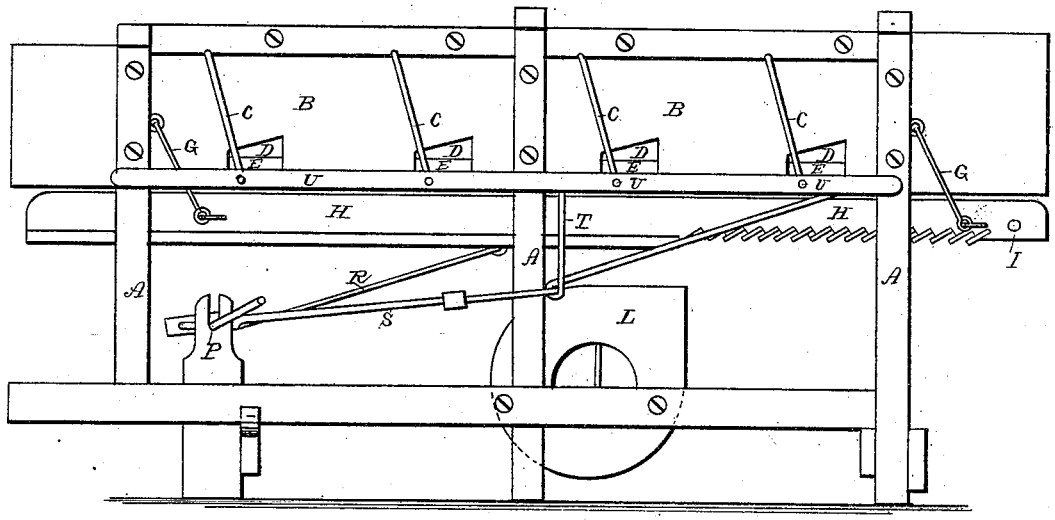
Figure 2:
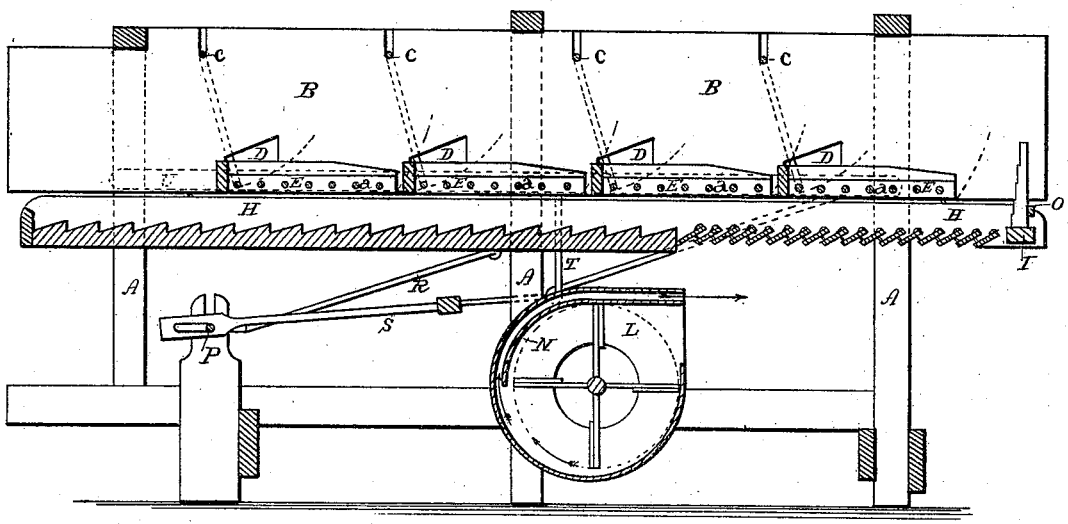
Figure 3:
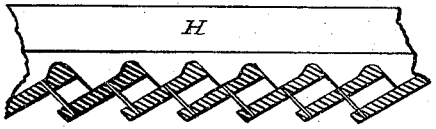

Figure 1 is a side elevation of my invention. Fig. 2 is a vertical section of the same, and Fig. 3 a detail.

A represents a suitable frame-work, upon the upper portion of which are secured the fixed sides B, which form a way or guide, through which the straw passes. Passing through the top of these sides, and projecting down to their lower edges on the outer side, are the bent rocking shafts C, which have their lower ends passed through the holes D in the lower edges of the sides, and rigidly secured to the shakers E in such a manner that when the lower ends of the shafts are made to vibrate back and forth the shakers not only have their back ends thrown upward, but their whole bodies move forward and backward at the same time. As all of the shakers move at the same time, and having this upward tilting motion, the straw is passed along from one to another until it is finally carried through the end of the machine. These shakers, which serve in the double capacity of straw-conveyers and shakers, consist of a wooden frame having but three sides, and having the wires *a* extending across them at right angles to the length of the frame A, so as to let the shelled grain fall through. By making the shakers act in the double capacity of shakers and straw-conveyers, the operation of the machine is made more perfect and the operating parts greatly cheapened and simplified.

Suspended by the rods G from the sides B is the box-shaped carrier H, into which the grain falls from the straw while being agitated by the shakers E. The greater portion of the surface of the bottom of this carrier is formed into inclined recesses, the shoulders of which recesses catch behind the grains, and constantly force them forward to the back end, where there is formed a sort of sieve or lattice-work as wide as the carrier itself, and through which the shelled grain falls upon the riddles below. Passing through these inclined slats or lattice-work are a number of nails or other suitable stops at any desired distance apart, which serve to prevent the straw from being carried along through with the grain. In the rear end of this carrier is pivoted the shaft I, which is provided with the prongs or fingers O, having a series of shoulders formed upon them, for the purpose of catching hold of the straw after it has left the last shaker, and carrying it on out of the machine. These fingers or prongs can be turned upward at any desired angle; and as they are carried back and forth with the carrier, they serve not only to carry the straw out of the machine, but to prevent the straw from falling in the elevator-spout.

As the grain falls through the lattice-work upon the riddles below, it is subjected to a blast of air from a fan placed in the frame L. Inside of this fan-frame L is placed an inside curved sheet, N, there being a sufficient space between the plate and the top of the frame to allow a large volume of air to pass between them. The air being caught in between this plate and the top of the frame causes the fan to force it out with much greater power and to bring the wind directly under the lower shaker, where the grain falls through, and thus blow the chaff away before it comes down upon the sieve.

Journaled in the front end of the machine is the double-cranked shaft P, and fastened to each of these cranks are the two connecting-rods R and S. The one R is fastened to the under side of the carrier, while the one S is fastened to a rod, T, which projects across, under, and beyond the sides of the machine, and is connected by suitable rods with the long bars U, which bars U are secured to the rocking shafts and shakers. The two shafts cause the shakers to move forward while the carrier is moved backward, and vice versa.

Having thus described my invention, I claim—

1. The combination of the shakers and straw-conveyers E, suspended by the rods C at their rear ends, and connected to the rod U, with the carrier H, rods R S, and double-crank shaft P, whereby the shakers and carriers are made to move in opposite directions, substantially as shown.

2. The carrier H, provided with inclined recesses and lattice-work, and having the pivoted shouldered fingers O in its rear end just beyond the lattice-work, so as to eject the straw, substantially as described.

3. In a thrashing-machine, the straw-conveyers and shakers E, constructed substantially as shown, arranged in successive sections, and suspended by the rods C at their rear ends, and connected to the rods U, in combination with a mechanism for imparting to them a swinging motion, substantially as specified.

In testimony that I claim the foregoing I have hereunto set my hand this 6th day of November, 1878.

FLORENS KITTEN.

Witnesses:
FRANK QUANTE,
GEORGE DROSTE.